(No Model.)  5 Sheets—Sheet 2.

L. W. HEWES.
CRUSHING MACHINE.

No. 356,876. Patented Feb. 1, 1887.

Witnesses:
Frank J. Blanchard
Albert H. Adams

Inventor:
Lester W. Hewes (No Model.)  L. W. HEWES.  5 Sheets—Sheet 3.
CRUSHING MACHINE.
No. 356,876.  Patented Feb. 1, 1887.
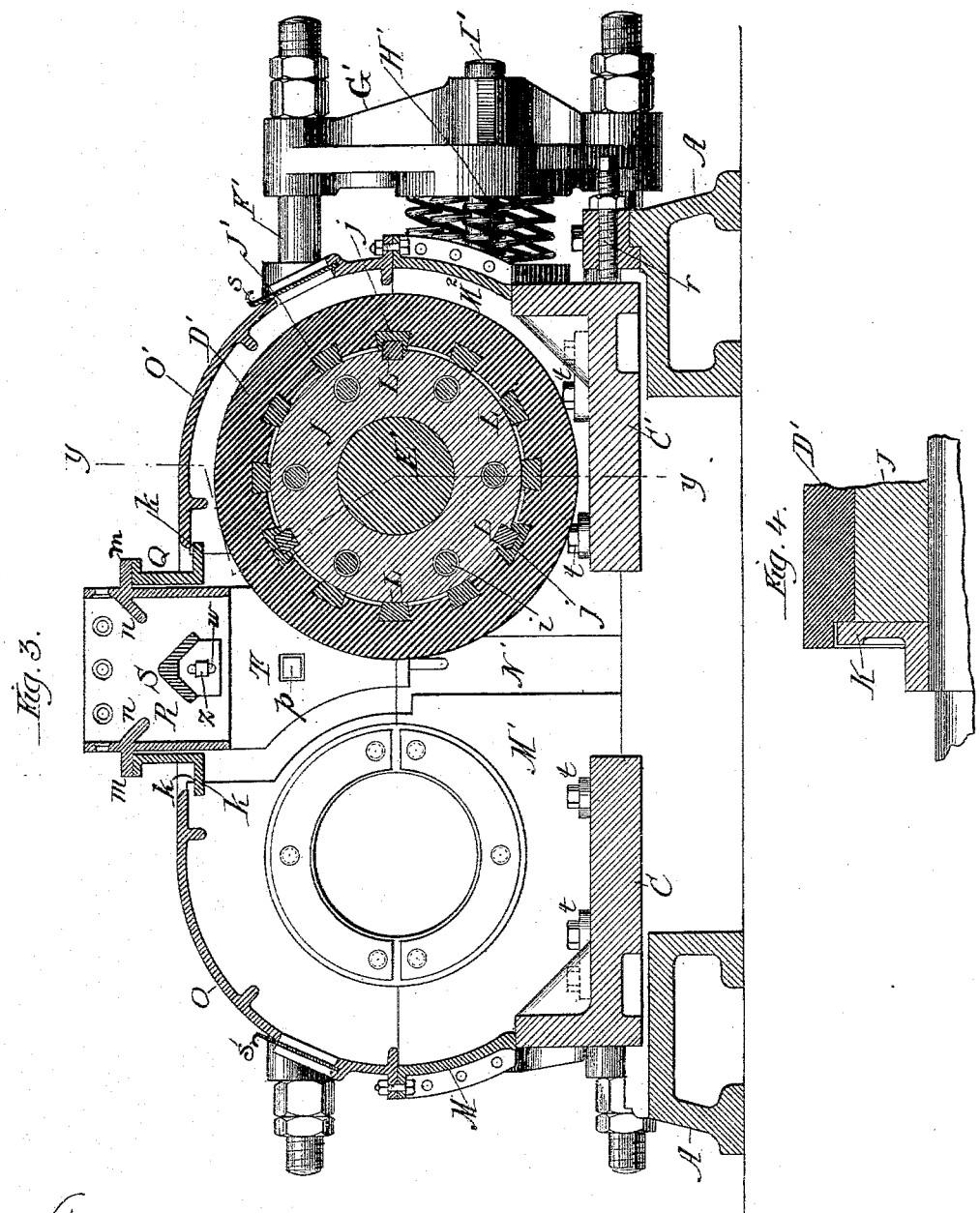
Witnesses:
Frank J. Blanchard
Albert H. Adams
Inventor:
Lester W. Hewes.

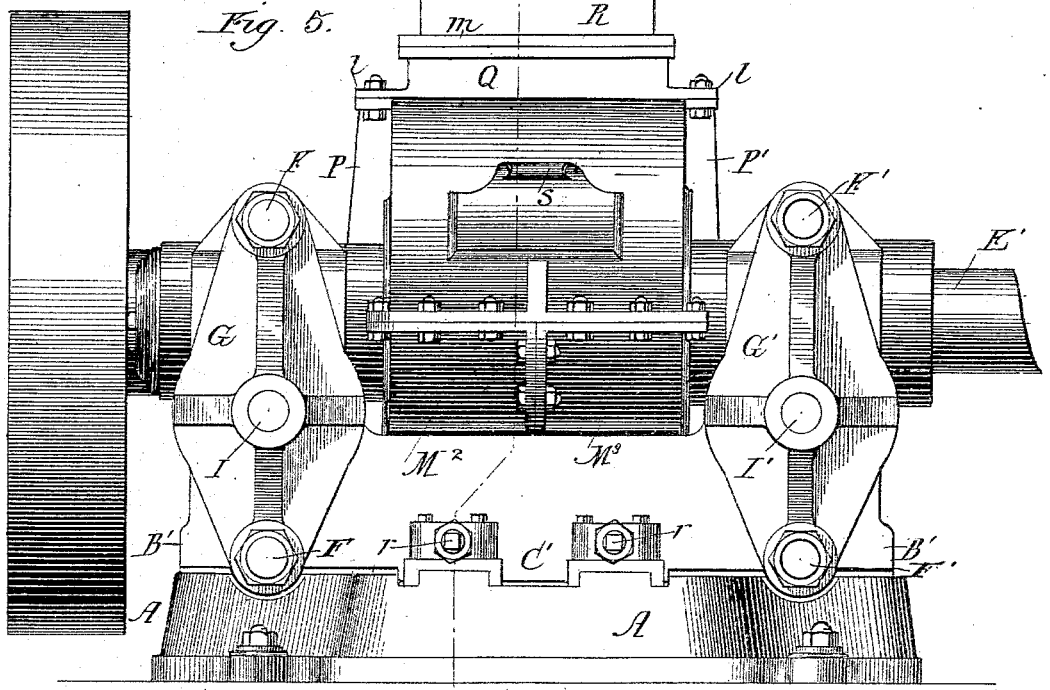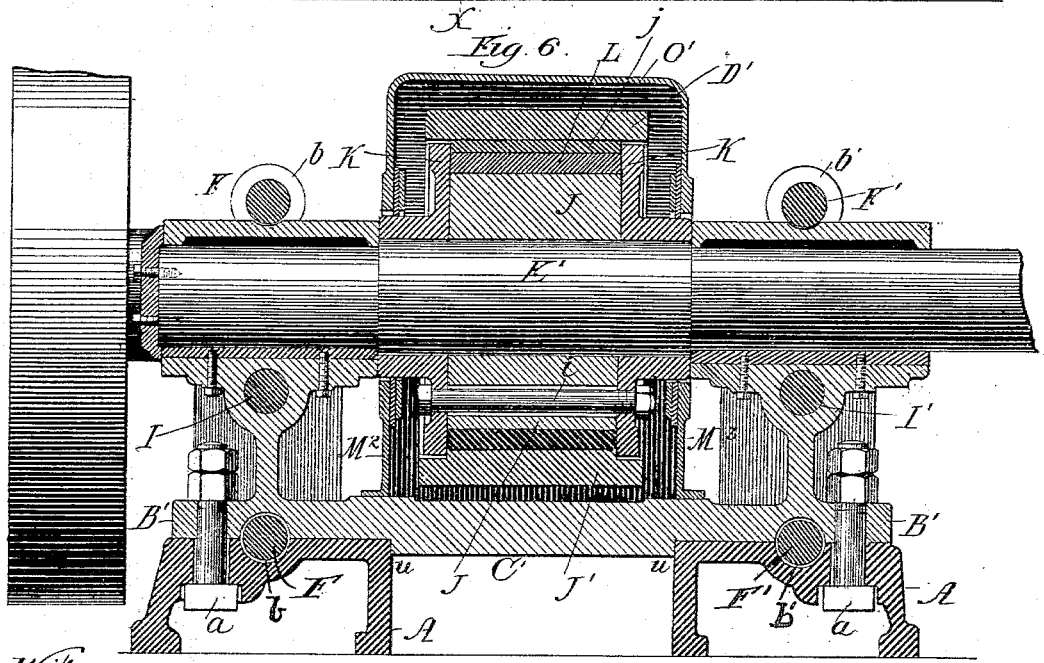

(No Model.) 5 Sheets—Sheet 5.
L. W. HEWES.
CRUSHING MACHINE.
No. 356,876. Patented Feb. 1, 1887.
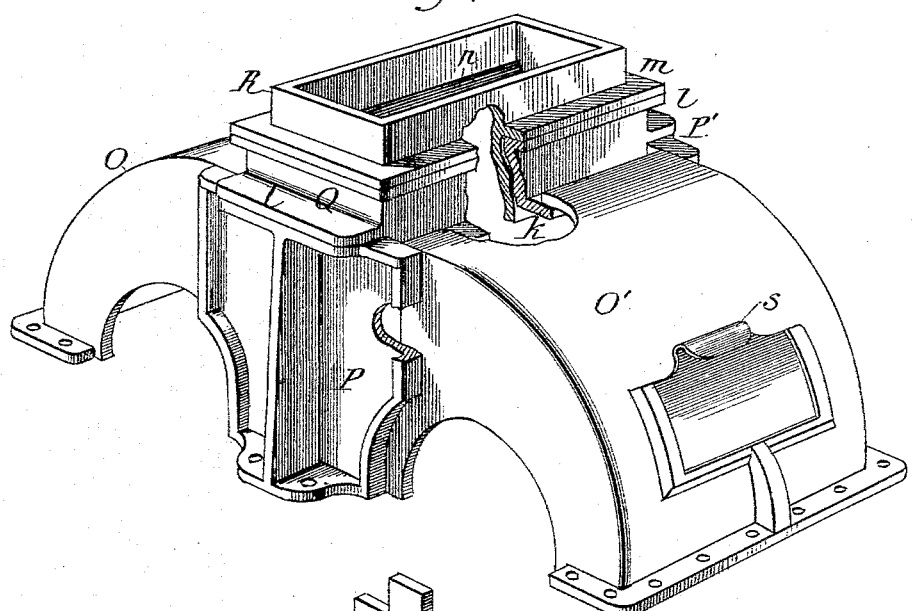
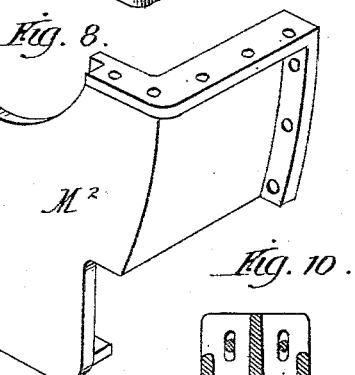
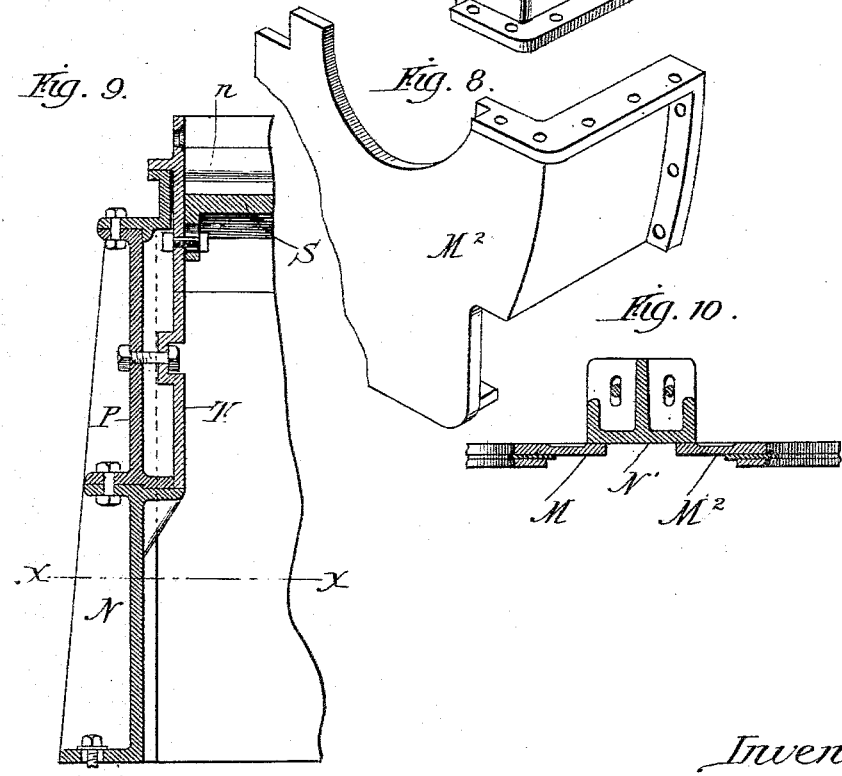
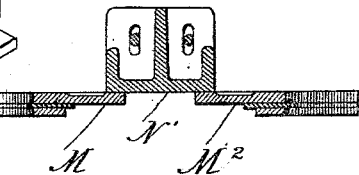
Witnesses:
Frank J. Blanchard
Albert H. Adams
Inventor:
Lester W. Hewes

UNITED STATES PATENT OFFICE.

LESTER W. HEWES, OF CHICAGO, ILLINOIS, ASSIGNOR TO THE EXCELSIOR IRON WORKS, OF SAME PLACE.

CRUSHING-MACHINE.

SPECIFICATION forming part of Letters Patent No. 356,876, dated February 1, 1887.

Application filed May 17, 1886. Serial No. 202,461. (No model.)

*To all whom it may concern:*

Be it known that I, LESTER W. HEWES, residing at Chicago, in the county of Cook and State of Illinois, and a citizen of the United States, have invented a new and useful Improvement in Crushing-Machines, of which the following is a full description, reference being had to the accompanying drawings, in which—

Figure 1:
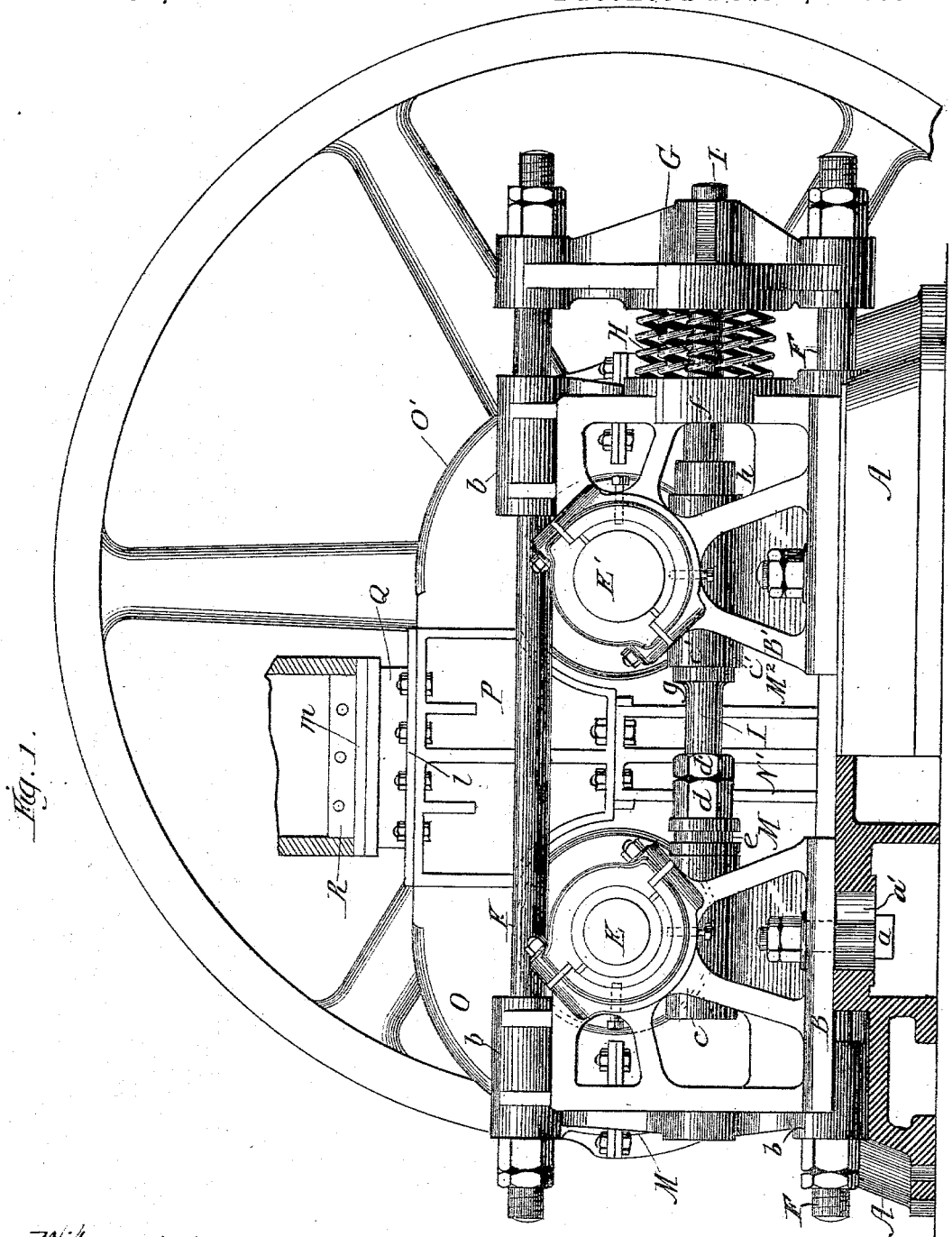
Figure 2:
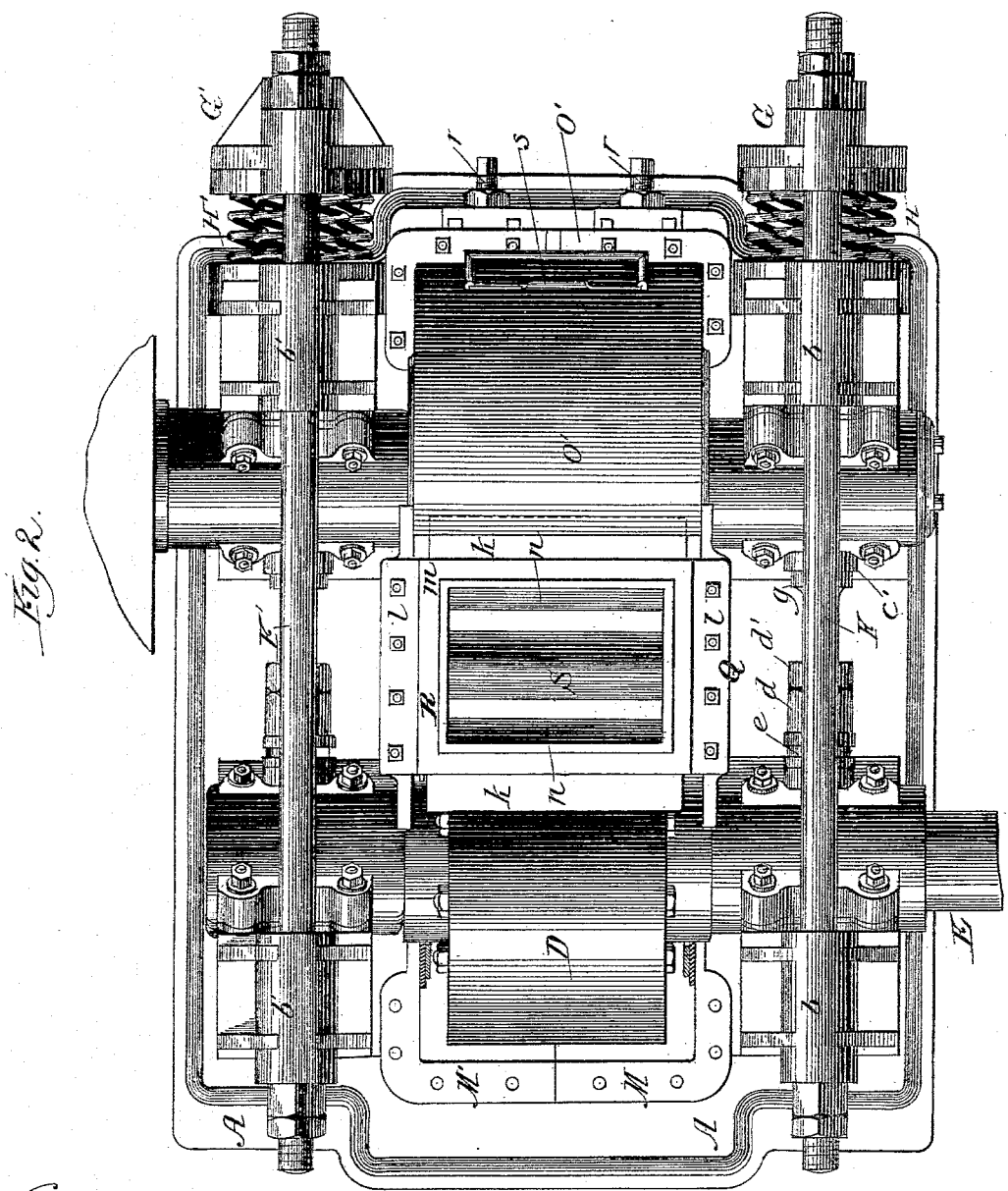

Figure 1 is a side elevation of the machine, partly in section. Fig. 2 is a plan, the upper part of the dust-cover being removed from one roll. Fig. 3 is a longitudinal vertical section at line $x\,x$ of Fig. 5, some parts being removed. Fig. 4 is a detail showing the center of the roller, the shell, and one of the holding-plates. Fig. 5 is an end view. Fig. 6 is a vertical section at line $y\,y$ of Fig. 3. Fig. 7 is a perspective showing the upper part of the housing with the hopper. Fig. 8 is a detail showing a portion of the lower part of the housing. Fig. 9 is a detail, being a vertical section through the center and one side of the housing and hopper. Fig. 10 is a section at line $x\,x$ of Fig. 9.

My invention relates to crushing-machines in which rollers are used, and for the purpose, mainly, of crushing ores; or the same may be used for other purposes.

The invention consists in the construction and combination of the various parts of a roller crushing-machine, as will be hereinafter described and claimed.

In the drawings, A represents the cast-iron bed-frame of the machine, made in one solid piece and planed to receive the parts which support the journal-bearings of the rollers.

B B are pillow-blocks, in which the bearings for the journals of one of the rollers are located, and B' B' are similar blocks, in which are located the journal-bearings for the second roller. These pillow-blocks are connected in pairs by their respective cross-pieces, C C', Figs. 3 and 6, which are each preferably cast in one piece with their pillow-blocks, as shown. If desired, however, the cross-pieces C C' may each be divided at the center and provided with flanges to receive connecting-bolts.

The pillow-blocks B B are loosely secured, by means of bolts $a$ and slots $a'$, to the bed A, so as to slide thereon. The pillow-blocks B' B' are also secured to the bed A in a similar manner, not so as to slide, but in such a way as to be capable of adjustment by loosening their bolts.

D is one of the crushing-rollers, located on a shaft, E. D' is the other crushing-roller on a shaft, E'.

F are two tension or holding rods on one side of the machine. These rods, as shown, pass through sockets $b$ at the top and bottom of the pillow-blocks B B'. On the other side of the machine are two other tension or holding rods, F', which pass through sockets $b'$ on the pillow-blocks B B'.

G G' are heads, through which the tension-rods F F' also pass. These rods F F', as shown, have threads and nuts on both ends, but may be constructed with a head and key upon one end and threads and nuts upon the other end.

H are strong springs between the pillow-block B' and head G upon one side of the machine, and H' are similar springs between the other head, G', and the pillow-block B'. These springs, as shown, are arranged in a circle.

I is an adjusting rod and guide, which acts in connection with the tension-rods F, as hereinafter more fully stated. One end of this rod I enters a socket, $c$, cast upon pillow-block B.

$d\,d'$ are two nuts upon the rod I, which is screw-threaded to receive them.

$e$ is a heavy rubber washer, through which the rod I passes. This rod I also passes through a socket, $c'$, cast on the pillow-block B', and extends through the pillow-block B' at $f$, and into and through the head G.

$g$ is a shoulder on rod I coming in contact with the socket $c'$, and $h$ is a collar on rod I. On the opposite side of the machine is another rod, I', constructed and operating in all respects the same as rod I.

Each roller consists of a central solid piece, J, and an outer shell or surface-ring, J'. The center J is made of common cast-iron turned off to the proper size. The surface-ring or shell J' is preferably made of chilled iron; but it may be made of cast or forged steel, and is bored so as to fit easily over the roll-center J. It is held in place firmly by follower-plates K K and bolts $i$.

L are feathers, which can be driven so as to positively and securely hold the surface-ring in place, any suitable number of these feathers being used. If the shell or surface-ring be made of chilled iron, the seats for the feathers should be made of soft-metal strips $j$, cast in the shell at suitable intervals. This method of securing the shell to the center of the roller is effective, and allows of the easy removal of the surface-ring and the replacing of the same when worn.

I have provided a housing or dust-protector for the rollers which does not require adjustment every time that the rollers are adjusted relatively to each other, and portions of which can move as the rollers move toward or from each other. This housing consists of a number of sections.

M represents one section of the housing which is secured to the pillow-block B. It covers a part of one end and a portion of one side of one roller. The section M' is another section on the opposite side of the machine, corresponding with section M. M² is another section secured to the pillow-block B', and M³ is another section corresponding with the section M². The sections M² and M³ are bolted together at the center, as shown in Fig. 5, and the sections M and M' are bolted together in the same way.

N is a stationary section which is bolted to the bed or frame. N' is a similar stationary section on the opposite side. These stationary sections N N' are so arranged that the inner ends of the sections M, M', M², and M³ pass within them, as shown in Fig. 10. These parts form the lower half or part of the housing.

O O' are the two main sections of the upper half of the housing, and are bolted, respectively, to the lower sections, as shown in Fig. 3.

P P' are two stationary sections of the upper part of the housing, which are respectively secured to the upper ends of the sections N N'.

Q is a rectangular casting which receives the hopper. The lower end of the casting Q is provided with a flange, $k$, on each side, and with a flange, $l$, at each end, which flanges $l$ rest upon the upper ends of the stationary sections P P'. The inner ends of the sections O O' pass within the sections P P' and over the flanges $k$, and they are bolted to the lower half of the housing, so that the upper part of the housing can be all removed to allow the removal of one or both of the rollers, if necessary.

R is the hopper, preferably made of hard or white iron. The lower part of the hopper enters the casting Q, and it is provided with a flange, $m$, which rests upon the top of the casting Q.

$n$ $n$ are two inclines upon the inside of the hopper, one upon each side.

S is a bar which extends across the hopper longitudinally, and is adjustably attached to the ends of the hopper in any suitable manner. This casting is of the form shown in Fig. 3, being inclined each way from its longitudinal center, and may, if desired, be adjusted vertically by means of a slot, $w$, and bolt $z$ at each end.

T is a plate of metal, one of which is secured in place by a bolt, $p$, Fig. 3, in each side of the machine within the upper part of the housing, its object being to furnish a facing to receive the wear occasioned by the passage of the ore or other material and protect the parts it covers. These plates can be replaced whenever necessary.

Screws $r$—one of which is shown in Fig. 3—may be used for the purpose of aiding in adjusting the bearings for the roller D'.

$s$ are sliding doors in the housing. $t$ are bolts by which the lower portions of the housing are secured in place.

The lower ends of the pillow-blocks B B' and their connecting-pieces C C' are shouldered on their under sides, as shown at $u$, Fig. 6, so that the shoulders fit in between the two side pieces of the bed-frame, and as the pillow-blocks B B' move upon the frame the parallelism will be maintained.

The pillow-blocks B, as before stated, are rather loosely connected with the bed, so that the roller D can move a little back and forth. The springs H H' hold the roller D in a given position under all ordinary conditions. These springs act upon such roller through the heads G G' and tension-rods F F'.

If material passes in between the rollers which they cannot crush, then the pressure upon these springs will be of course somewhat greater than before, and they will be somewhat compressed and the roller D can move back. As soon as the material has passed, then the action of the springs will return the roller D to its former position.

The roller D can be adjusted to any given position and held and prevented from approaching any nearer to the roller D' by means of the adjusting-rods and guides I I', simply by changing the position of the nuts $d$ $d'$. The shoulders $g$ being in contact with the sockets $c'$, it is evident that by turning these nuts $d$ $d'$ the roller D can be set a little farther back from or permitted to come a little nearer to the other roller, D'. The required tension can be given to the springs H H' by means of the nuts upon tension-rods F F'. The rods I I' also serve the purpose of guides and supports for the spring-heads G G' and the springs H H'.

By providing the hopper with the inclines $n$ and the bar S, which can be adjusted vertically, the passages for the material can be adjusted so that nothing above a given size will be allowed to enter the machine.

What I claim as new, and desire to secure by Letters Patent, is—

1. The combination, with the crushing-rollers D D' and the pillow-blocks B B', of the adjusting-rods I I' and the upper and lower tension rods, F F', substantially as described.

2. The combination, with the crushing-rollers D D' and the pillow-blocks B B', of the tension-rods F F', heads G G', springs H H', and adjusting-rods I I', substantially as described.

3. The combination, with the bed-frame A, pillow-blocks B B', and rollers D D', of a housing composed of the sections M M' and M² M³, secured to the pillow-blocks and movable therewith, the stationary sections N N', secured to the bed-frame, the upper movable sections, O O', secured to the lower movable sections, the upper stationary sections, P P', secured to the lower stationary sections, and the flanged casting Q, resting on the upper stationary sections, whereby the housing is movable with either roller, substantially as described.

4. A roller consisting of the center J, the surface-ring J', the follower-plates K K, bolts i i, and feathers L L, substantially as described.

LESTER W. HEWES.

Witnesses:
 ALBERT H. ADAMS,
 O. W. BOND.